J. N. MEYER.
Horseshoe.

No. 214,940. Patented April 29, 1879.

WITNESSES
Robert Everett
N. Clay Smith

INVENTOR
John N. Meyer.
By Gilmore, Smith & Co.
ATTORNEYS

UNITED STATES PATENT OFFICE.

JOHN N. MEYER, OF HAMILTON, NEW YORK.

IMPROVEMENT IN HORSESHOES.

Specification forming part of Letters Patent No. 214,940, dated April 29, 1879; application filed March 8, 1879.

*To all whom it may concern:*

Be it known that I, JOHN N. MEYER, of Hamilton, in the county of Madison and State of New York, have invented certain new and useful Improvements in Horseshoes; and I do hereby declare that the following is a full, clear, and exact description of the construction and operation of the same, reference being had to the annexed drawings, making a part of this specification, and to the letters and figures of reference marked thereon.

Figure 1:
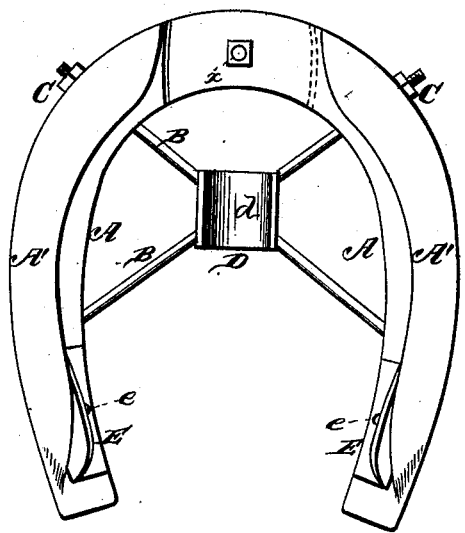
Figure 2:
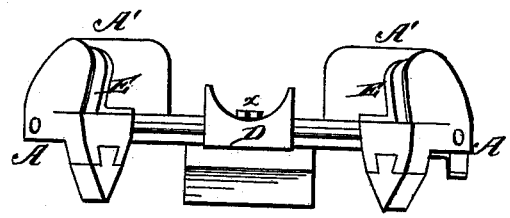

Figure 1 of the drawings is a representation of a plan view of my invention, and Fig. 2 is a rear-edge view of the same.

My invention relates to horseshoes; and consists in the construction and arrangement of parts, as will be more fully hereinafter set forth.

In carrying out my invention I employ two semicircular parts provided with flanges which are adapted to receive and clamp the hoof of the animal, and pivoted together at the front center, as shown. Headed bolts pass from each quarter to the opposite part, crossing each other in the center, where they pass through a frog-pad of rubber or spongy material having a recess which receives the frog. V-shaped pads serve to embrace the rear quarter of the hoof, and prevent cracking.

Referring to the drawings, A represents the sides of the shoe, having inclined flanges A', as shown, pivoted together at $x$. B B represent securing-rods, which pass from the quarter of one side to the opposite forward portion of the other half, and, being provided with nuts or burrs C, serve, when drawn in by the nuts, to clamp the shoe firmly to the hoof of the animal without the use of nails. These rods B cross each other at their centers, where they pass through a frog-pad, D, having recess $d$, which receives the frog of the hoof and protects that sensitive part. Soft pads E, of leather, protect the quarters of the hoof to prevent cracking, such pads E being secured to the shoe at $e$, as shown.

What I claim as new, and desire to secure by Letters Patent, is—

1. The combination of the sides A, pivoted at $x$ and having flanges A', as shown, with the rods B and nuts C, as and for the purposes set forth.

2. The combination of the sides A, pivoted at $x$, having flanges A' A', heel-pads E, rods B, nuts C, and frog-pad D, as and for the purposes specified.

In testimony that I claim the above I have hereunto subscribed my name in the presence of two witnesses.

JOHN N. MEYER.

Witnesses:
B. J. STIMSON,
C. M. WICKWIRE.